United States Patent [19]
Appelt

[11] Patent Number: 5,733,584
[45] Date of Patent: Mar. 31, 1998

[54] APPARATUS FOR THE MANUFACTURE OF FILMS

[75] Inventor: Horst G. Appelt, Wuppertal, Germany

[73] Assignee: Warner-Lambert Co., Morris Plains, N.J.

[21] Appl. No.: 687,332

[22] PCT Filed: Feb. 1, 1995

[86] PCT No.: PCT/EP95/00363

§ 371 Date: Oct. 4, 1996

§ 102(e) Date: Oct. 4, 1996

[87] PCT Pub. No.: WO95/21735

PCT Pub. Date: Aug. 17, 1995

[30] Foreign Application Priority Data

Feb. 8, 1994 [DE] Germany ............... 9402027 U

[51] Int. Cl.⁶ .............. B29C 47/14; B29D 7/01
[52] U.S. Cl. .............. 425/174.8 E; 425/363; 425/373; 425/370; 264/484
[58] Field of Search .............. 425/174.8 R, 176.8 E, 425/373, 374, 363; 264/484

[56] References Cited

U.S. PATENT DOCUMENTS 3,223,757  12/1965  Owens et al. .
3,823,061  7/1974  Frayer et al. .
4,309,368  1/1982  Groves ............... 425/174.8 E
4,608,212  8/1986  Isner ............... 425/174.8 E

FOREIGN PATENT DOCUMENTS

| 0026028 | 4/1981 | European Pat. Off. . | |
| 2252207 | 7/1975 | France | 425/174.8 E |
| 2474899 | 8/1981 | France . | |
| 2234073 | 1/1974 | Germany | 425/174.8 E |
| 2460432 | 6/1976 | Germany | 425/174.8 E |

*Primary Examiner*—Khanh P. Nguyen
*Attorney, Agent, or Firm*—Charles W. Almer

[57] ABSTRACT

The invention concerns an apparatus for the manufacture of films, in particular thin or very thin films, with a rotating roller with which a plastically deformable film preferably supplied by a slot extruder is conveyed and stretched, wherein between the roller and a metal belt arranged parallel and at a short distance from the roller is applied a voltage by which the film supplied is applied to the roller. In order to develop this apparatus in such a way that manufacture of films, in particular thin or very thin films, is possible with increased productivity and film quality, with the invention it is proposed that the metal belt comprises a sharp longitudinal edge which is arranged closest to the roller and directed onto it.

25 Claims, 2 Drawing Sheets

APPARATUS FOR THE MANUFACTURE OF FILMS

BACKGROUND OF THE INVENTION

1. Field of the Invention

The invention concerns an apparatus for the manufacture of films, in particular thin or very thin films, with a rotating roller with which a plastically deformable film preferably supplied by a slot extruder is conveyed and stretched, wherein between the roller and a metal belt arranged parallel and at a short distance from the roller is applied a voltage by which the film supplied is applied to the roller.

2. Description of the Related Art

For the manufacture of films, in particular thin or very thin films, an apparatus is known in which the film supplied to the apparatus is applied to a roller and contacts the roller surface over a certain angle of wrap. Due to adhesion of the film to the roller surface, the moment produced by the roller is transmitted to the film, so that the film is stretched in the region located in front of the roller. By stretching, the film which is usually supplied by a slot extruder is reduced to a lower thickness. This thickness in the case of thin or very thin films is between 30 mµ and <1 mµ. Use of a slot extruder in the apparatus is preferred, as the heat supplied to the film in the slot extruder is utilised in plastic deformation of the film. Between the roller and a metal belt arranged at a distance of about 3–6 mm parallel to the roller, a relatively high d.c. voltage of 5 and 7 kV is applied, the belt being connected to the positive terminal and the roller to the negative terminal. The film is fed to the roller through the gap formed between the metal belt and the roller, the film being applied to the roller on account of the electric field formed between the metal belt and the roller. This is intended to prevent the occurrence of trapped air between the film and the roller, which leads to reduced productivity and reduced film quality.

It is known that metal belts of rectangular cross-section made of special steel can be arranged parallel to the roller by clamping. The known metal belts are cut from a film about 0.02 mm thick to the necessary width of 10 mm. These belts have the drawback that the edges produced by the cutting process are irregular, so that the electric field between the metal belt and the roller is distorted. These distortions lead on the one hand to electric arcing, by which the film is damaged, and on the other hand to a decrease in efficiency of the voltage, so that the effect of applying the film to the roller, which is produced by the voltage, is reduced, and breakdowns in production as well as trapped air between film and roller occur. Furthermore the metal belt cut from special steel film has the drawback that strong enough clamping forces to clamp the belt with the necessary precision at a uniform distance from the roller cannot be applied. This irregular distance also results in distortion of the electric field between the steel belt and the roller. Distortions of the electric field lead in general to reduced productivity and reduced film quality in the manufacture of films, in particular thin or very thin films, with this apparatus known from the state of the art.

SUMMARY OF THE INVENTION

It is the object of the invention to develop an apparatus of the kind described hereinbefore in such a way that manufacture of films, in particular thin and very thin films, is possible with increased productivity and film quality.

To achieve this object it is proposed that the metal belt comprises a sharp longitudinal edge which is arranged closest to the roller and directed onto it.

As the longitudinal edge of the metal belt is arranged closest to the roller and directed onto it, the shortest distance between the metal belt and the roller arises between the longitudinal edge and the roller, so that an electric field of high field strength spreads out, starting from this longitudinal edge. As the metal belt comprises only one longitudinal edge, the steel belt itself may have a thickness which allows application of the necessary clamping forces, so that the metal belt can be clamped with sufficient precision at a uniform-distance from the roller. In general an electric field which is uniform over the length of the roller is produced, so that while avoiding electric arcing between the roller and the metal belt, the occurrence of trapped air between the film and the roller is reliably avoided. As a result, with the apparatus according to the invention it is possible to manufacture films, in particular thin or very thin films, with increased productivity and film quality.

According to the invention the apparatus is developed by a metal belt of which the sharp longitudinal edge is formed after the fashion of a cutting edge in a tapering region of the metal belt. The tapering region displays such stiffness and strength that the cutting edge retains its shape even under mechanical, thermal or other stress.

By arranging the metal belt at a distance of less than 6 mm from the roller, an electric field is produced by which the film is reliably applied to the roller, so that with an ordinary d.c. voltage of 5 to 7 kV between the roller and the metal belt, trapped air between the roller and the film is reliably avoided.

Preferably the apparatus is developed according to the invention by the fact that the centre line of the tapering region is aligned with the centre of the roller. This results in a symmetrical orientation of the electric field, as a result of which an increase in film quality is possible.

Preferably the surface of the tapering region of the metal belt is convexly curved, which leads to improved formation of the electric field. Furthermore due to the convex curvature the cross-sectional area of the metal belt behind the apex is widened, so that the electrical resistance is reduced.

In a preferred embodiment the cross-sectional shape of the tapering region at a distance of 0–100 µm starting from the sharp longitudinal edge is described by the function $w/2 = \frac{1}{2} e^A d^B/25^B$. Here, d is the distance in µm from the apex, e is the Euler's number, and A is an exponent freely selectable within the range 2,064 to 2.282 and B an exponent freely selectable within the range 0.7 to 0.86. Practical tests have shown that with the apparatus according to the invention in case of such a construction of the metal belt films of very high quality can be manufactured with high productivity.

To reduce the requirements in manufacture of the metal belt and thus to increase economy in the manufacture of films, it is sufficient, for formation of the cross-sectional shape of the tapering region of the metal belt, to maintain the function $w/2 = \frac{1}{2} e^A d^B/25^B$, at a distance of 0–40 µm starting from the sharp longitudinal edge.

Advantageously the invention is developed by the fact that two surfaces extending parallel to each other are formed on the metal belt. As a result, fixing of the steel belt ends and application of the necessary clamping forces can be facilitated.

According to the invention it is further proposed that a blade belt for razor blades with its cutting edge aligned with the roller is used as the metal belt. Such a blade belt is manufactured in a continuous process with very high precision, so that it is available as the metal belt in the necessary length and quality. The blade belt comprises a tapering region with a facet cut, preferably with three facets, by the end of which is formed a sharp longitudinal edge in the form of a cutting edge. When a blade belt is used according to the invention as a metal belt in the apparatus for the manufacture of films, the electric field spreads out uniformly from this cutting edge to the roller. Due to the facet cut of the blade belt moreover a larger distance between the blade belt and the roller is possible, which leads to greater process reliability. The tapering region of the razor blade is adjoined by a region with surfaces extending parallel to each other, by means of which the blade belt can easily be mounted at its ends. In general the blade belt is stiffer than the known metal belt cut from a film and does not tear so easily. Due to the improved strength, stronger clamping forces can be applied, so that the blade belt can be clamped with improved precision at a constant distance from the roller. The blade belt has a larger cross-section than the metal belt known from the state of the art, so that the electrical resistance of the metal belt is reduced. In general by using a blade belt in an apparatus for the manufacture of films the productivity of the apparatus is increased and the quality of the films manufactured is improved.

In a development of the apparatus according to the invention, the length of the metal belt exceeds the width of the roller by a multiple, and the metal belt is moved past the roller in a time cycle by the width of the roller. As the metal belt which is clamped freely parallel to the roller is subject to electrocorrosion, and furthermore deposits and deformation can lead to a change of shape of the sharp longitudinal edge, due to such a development according to the invention after a predetermined time cycle a new, unused section of the metal belt can easily be arranged parallel to the roller. As a result it is ensured in general that even with continuous operation of the apparatus a film of constant quality is manufactured.

Preferably the time cycle is six hours. Practical tests have shown that after an exposure time of the metal belt of six hours, the quality of the films manufactured declines.

Preferably the metal belt is moved past the roller in a time cycle by unwinding from one reel and winding onto another reel. With this manner of operation of the apparatus according to the invention, at any given time an unused section of the metal belt can easily be arranged parallel to the roller, so that the film is always manufactured in the desired quality.

Further characteristics and advantages of the invention are apparent from the claims and the description below, in which a practical example is described in more detail. The drawings show:

DESCRIPTION OF THE PREFERRED EMBODIMENTS

Figure 1:
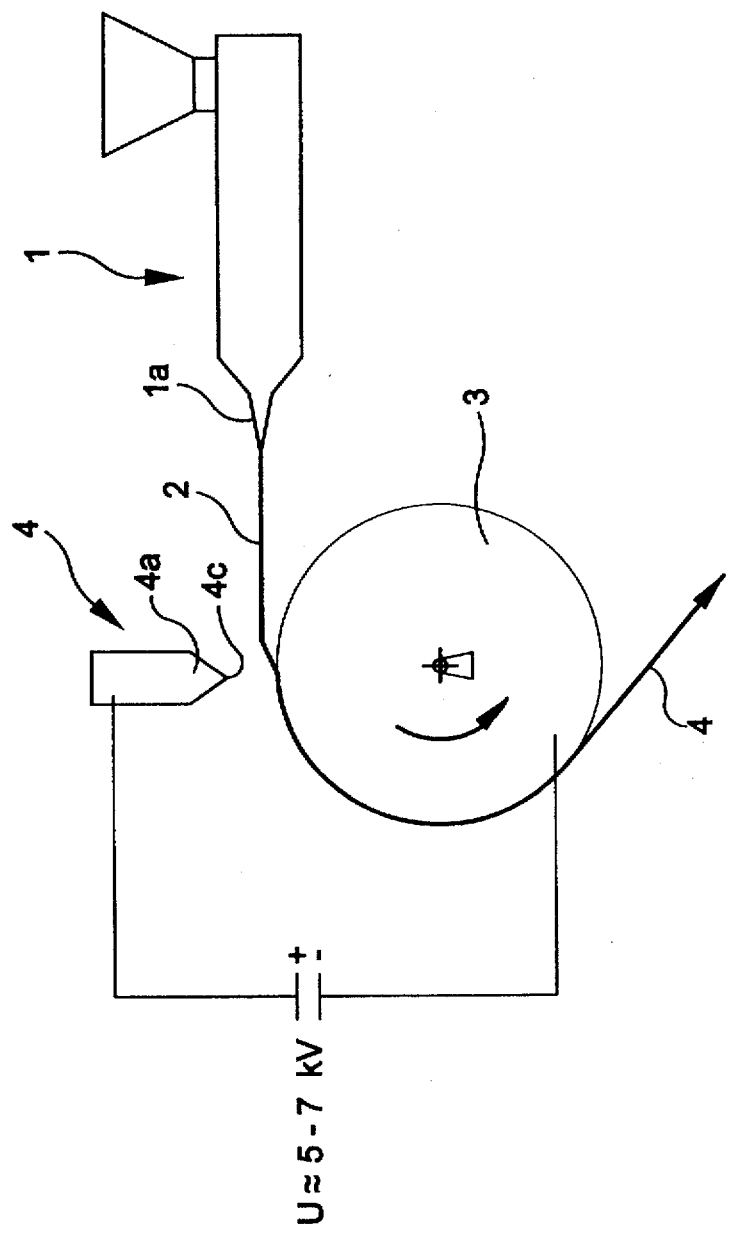
FIG. 1 a schematic side view of an apparatus for the manufacture of thin films.

FIG. 1 shows a schematic side view of an apparatus for the manufacture of films with an extruder 1, via the slot die 1a of which a film 2 is supplied to a roller 3. A metal belt 4 is clamped parallel to the roller 3, a voltage being applied between the metal belt 4 and the roller 3. The metal belt 4 comprises a tapering region 4a with a sharp longitudinal edge 4c, which is directed onto the roller 3. Between the sharp longitudinal edge 4c and the roller 3 remains a gap of about 2–5 mm, through which the film 2 is supplied to the roller 3. Starting from the position of the metal belt 4, the film 2 contacts the roller 3 with an angle of wrap of about 170°.

The metal belt 4 comprises, adjoining the tapering region 4a, surfaces which are formed parallel to each other and at which the metal belt 4 is mounted at its respective ends. Mounting is such that the metal belt is clamped with high precision at a uniform distance from the roller. As the metal belt 4 is clamped freely over the whole width of the roller 3 of about 1.20 m, the metal belt 4 can easily be damaged, so that the mounting of the metal belt 4 allows mounting and dismounting of the metal belt without problems.

In the manufacture of films, a high d.c. voltage of between 5 and 7 kV with a current of a few milliamperes is applied between the metal belt 4 and the roller 3. On account of the flow of ions including ions contained in the air to the negatively charged roller 3, the film 4 supplied to the roller 3 is applied to the roller 3 in the gap formed by the metal belt 4 and the roller 3. This prevents air from being trapped between the film 2 and the roller 3, which leads to a reduced quality of the film manufactured. As the shortest distance between the metal belt 4 and the roller 3 is between the longitudinal edge 4c and the roller 3, the electric field spreads out from the longitudinal edge 4c to the roller 3. Due to the secure mounting of the metal belt 4 and the exact shape of the sharp longitudinal edge 4c, this electric field forms with the same intensity across the full width of the roller 3. Distortions of the electric field are avoided as a result. Similarly electric arcing between the roller 3 and the metal belt 4 is prevented.

As the film 2 is applied uniformly to the roller 3 in the gap formed by the metal belt 4 and the roller 3 and contacts the roller with an angle of wrap of about 170°, the film 2 can be taken off from the slot die 1a with a force which can be determined by the moment of the roller 3, and therefore stretched. Due to stretching the thickness of the film 2 is reduced, so that films of different thickness can be manufactured with the apparatus.

Figure 2:
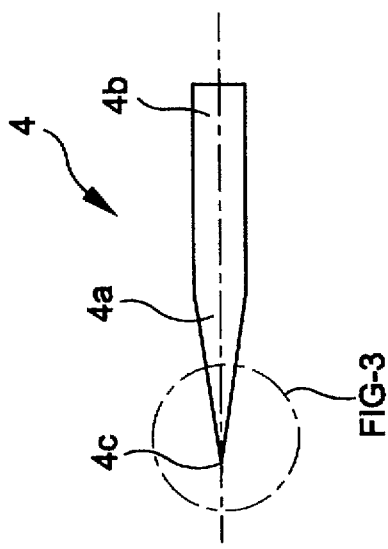
FIG. 2 a cross-section through a metal belt.

FIG. 2 shows a cross-section through a practical example of a metal belt 4. The metal belt 4 comprises, as the cross-sectional view shows clearly, two regions, the tapering region 4a being formed with a convexly curved surface. This tapering region 4a is adjoined by a region 4b with surfaces extending parallel to each other.

Figure 3:
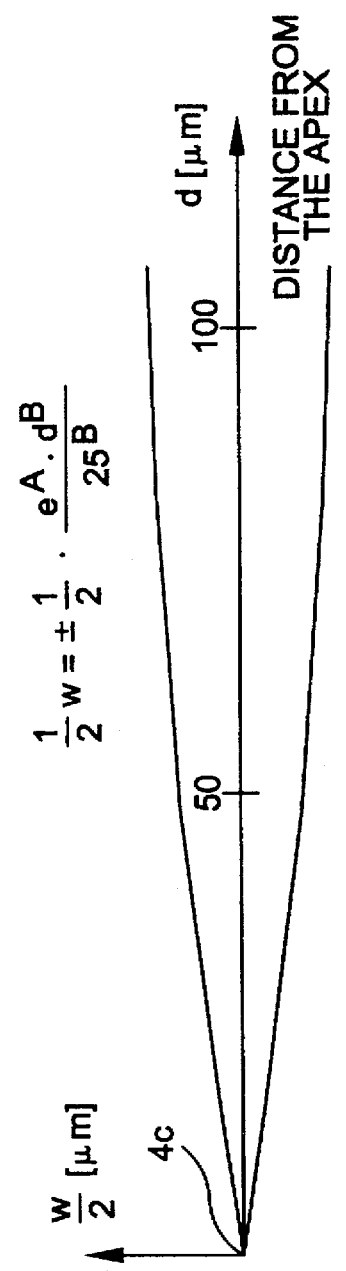
FIG. 3 an enlarged cross-sectional view according to the detail III in FIG. 2.

As can be seen from the enlarged cross-sectional view shown in FIG. 3, the apex of the tapering region 4a at a distance of 0–100 µm starting from the longitudinal edge 4c is described by the function $w/2 = \frac{1}{2} e^A d^B / 25^B$. Here d is the distance in µm from the apex and e the Euler's number. In the present embodiment the exponent A was fixed at 2.1 and the exponent B at 0.7. The centre line of the tapering region 4a is drawn in in FIG. 3 in accordance with the abscissa of the coordinate system. This abscissa displays the values for d as the distance in µm from the longitudinal edge 4c. The ordinate is tangent to the longitudinal edge 4c. With increasing distance d from the longitudinal edge 4c, the thickness w of the cross-section indicated in µm increases.

Practical tests have shown that with design of the tapering region 4a according to the cross-sectional shape shown in FIG. 3, the manufacture of films, in particular thin and very thin films, is considerably improved. Due to the specific shape, the shape of the electric field is favourably affected, so that both the productivity and the film quality are increased. It proved to be particularly advantageous to use a razor blade belt as the metal belt with a sharp longitudinal edge in order to bring about the above-mentioned improvements in the manufacture of thin and very thin films.

List of Reference Numbers

| 1 | extruder |
| 1a | die |
| 2 | film |
| 3 | roller |
| 4 | metal belt |
| 4a | tapering region |
| 4b | region with surfaces parallel to each other |
| 4c | longitudinal edge |

I claim:

1. Apparatus for the manufacture of thin films with a rotating roller with which a plastically deformable film supplied by a slot extruder is conveyed and stretched, wherein a gap exists between the roller and a metal belt arranged parallel to the roller and a voltage is applied between the metal belt and the roller, wherein the metal belt comprises a tapered region having a sharp longitudinal edge which is arranged closest to the roller and directed onto it and an unsharpened region having surfaces extending parallel to each other and wherein the tapered region at a distance of 0–100 µm starting from the sharp longitudinal edge has a cross-sectional shape described by the function $w/2 = \frac{1}{2} e^A d^B/25^B$, w being a thickness of the cross-sectional shape in µm, d being a distance in µm from the sharp longitudinal edge to a desired measuring point on the tapered region, e the Euler's number, and A an exponent freely selectable within the range 2.064 to 2.282 and B an exponent freely selectable within the range 0.7 to 0.86.

2. Apparatus according to claim 1, wherein the sharp longitudinal edge comprises a cutting edge in the tapered region of the metal belt.

3. Apparatus according to claim 1, wherein the metal belt is spaced less than 6 mm from the roller.

4. Apparatus according to claim 1, wherein the tapered region has a center line which is aligned with the center of the roller.

5. Apparatus according to claim 1, wherein the tapered region of the metal belt comprises a surface which is convexly curved.

6. Apparatus according to claim 1, wherein the cross-sectional shape of the tapered region at a distance of 0–40 µm starting from the sharp longitudinal edge is described by the function $w/2 = \frac{1}{2} e^A d^B/25^B$, w being a thickness of the cross-section shape in µm, being a distance in µm from the sharp longitudinal edge to a desired measuring point on the tapered region, e the Euler's number, and A an exponent freely selectable within the range 2.064 to 2.282 and B an exponent freely selectable within the range 0.7 to 0.86.

7. Apparatus according to claim 1, wherein two surfaces extending parallel to each other are formed on the metal belt adjacent to the tapered region.

8. Apparatus according to claim 1, wherein the metal belt is a blade belt comprising a strip of razor blade material, with its cutting edge directed onto the roller.

9. Apparatus according to claim 1, wherein the length of the metal belt exceeds the width of the roller by a multiple, and the metal belt is moved past the roller in a time cycle by unwinding the metal belt from one reel and winding the metal belt onto another reel.

10. Apparatus according to claim 9, wherein the time cycle is six hours.

11. Apparatus for the manufacture of thin films with a rotating roller with which a plastically deformable film supplied by a slot extruder is conveyed and stretched, wherein a gap exists between the roller and a metal belt arranged parallel to the roller and a voltage is applied between the metal belt and the roller, wherein the metal belt comprises a tapered region having a sharp longitudinal edge which is arranged closest to the roller and directed onto it and an unsharpened region having surfaces extending parallel to each other and the sharp longitudinal edge comprises a cutting edge in the tapered region of the metal belt, wherein the tapered region at a distance of 0–100 µm starting from the sharp longitudinal edge has a cross-sectional shape described by the function $w/2 = \frac{1}{2} e^A d^B/25^B$, w being a thickness of the cross-section shape in µm, d being a distance in µm from the sharp longitudinal edge to a desired measuring point on the tapered region, e the Euler's number, and A an exponent freely selectable within the range 2.064 to 2.282 and B an exponent freely selectable within the range 0.7 to 0.86.

12. Apparatus according to claim 11, wherein the metal belt is spaced less than 6 mm from the roller.

13. Apparatus according to claim 11, wherein the tapered region has a center line which is aligned with the center line of the roller, wherein the tapered region has a center line which is aligned with the center of the roller.

14. Apparatus according to claim 11, wherein the tapered region of the metal belt comprises a surface which is convexly curved.

15. Apparatus according to claim 11, wherein the cross-sectional shape of the tapered region at a distance of 0–40 µm starting from the sharp longitudinal edge is described by the function $w/2 = \frac{1}{2} e^A d^B/25^B$, w being a thickness of the cross-section shape in µm, d being a distance in µm from the sharp longitudinal edge to a desired measuring point on the tapered region, e the Euler's number, and A an exponent freely selectable within the range 2,064 to 2.282 and B an exponent freely selectable within the range 0.7 to 0.86.

16. Apparatus according to claim 11, wherein two surfaces extending parallel to each other are formed on the metal belt adjacent to the tapered region.

17. Apparatus according to claim 11, wherein the metal belt is a blade belt comprising a strip of razor blade material, with its cutting edge directed onto the roller.

18. Apparatus according to claim 11, wherein the length of the metal belt exceeds the width of the roller by a multiple, and the metal belt is moved past the roller in a time cycle by unwinding the metal belt from one reel and winding the metal belt onto another reel.

19. Apparatus according to claim 18, wherein the time cycle is six hours.

20. Apparatus for the manufacture of thin films with a rotating roller with which a plastically deformable film supplied by a slot extruder is conveyed and stretched, wherein a gap exists between the roller and a metal belt arranged parallel to the roller and a voltage is applied between the metal belt and the roller, wherein the metal belt comprises a tapered region having a sharp longitudinal edge which is arranged closest to the roller and directed onto it and an unsharpened region having surfaces extending parallel to each other and the sharp longitudinal edge comprises a cutting edge in the tapered region of the metal belt, wherein the tapered region has a center line which is aligned with the center line of the roller and wherein the tapered region of the metal belt comprises a surface which is convexly curved, wherein the tapered region at a distance of 0–100 µm starting from the sharp longitudinal edge has a cross-sectional shape described by the function $w/2=\frac{1}{2} e^A d^B/25^B$, w being a thickness of the cross-section shape in μm, d being a distance in μm from the sharp longitudinal edge to a desired measuring point on the tapered region, e the Euler's number, and A an exponent freely selectable within the range 2.064 to 2.282 and B an exponent freely selectable within the range 0.7 to 0.86.

21. Apparatus according to claim 20, wherein the cross-sectional shape of the tapered region at a distance of 0–40 μm starting from the sharp longitudinal edge is described by the function $w/2=\frac{1}{2} e^A d^B/25^B$, w being a thickness of the cross-section shape in μm, d being a distance in μm from the sharp longitudinal edge to a desired measuring point on the tapered region, e the Euler's number, and A an exponent freely selectable within the range 2.064 to 2.282 and B an exponent freely selectable within the range 0.7 to 0.86.

22. Apparatus according to claim 21, wherein two surfaces extending parallel to each other are formed on the metal belt adjacent to the tapered region.

23. Apparatus according to claim 22, wherein the metal belt is a blade belt comprising a strip of razor blade material, with its cutting edge directed onto the roller.

24. Apparatus according to claim 23, wherein the length of the metal belt exceeds the width of the roller by a multiple, and the metal belt is moved past the roller in a time cycle by unwinding the metal belt from one reel and winding the metal belt onto another reel.

25. Apparatus according to claim 24, wherein the time cycle is six hours.

* * * * *